United States Patent
Prasad et al.

(10) Patent No.: US 9,841,979 B2
(45) Date of Patent: Dec. 12, 2017

(54) METHOD AND APPARATUS FOR SHUFFLING DATA USING HIERARCHICAL SHUFFLE UNITS

(71) Applicant: SAMSUNG ELECTRONICS CO., LTD., Suwon-si (KR)

(72) Inventors: Keshava Prasad, Suwon-si (KR); Navneet Basutkar, Yongin-si (KR); Young Hwan Park, Yongin-si (KR); Ho Yang, Hwaseong-si (KR); Yeon Bok Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 14/330,562

(22) Filed: Jul. 14, 2014

(65) Prior Publication Data

US 2015/0127924 A1    May 7, 2015

(30) Foreign Application Priority Data

Nov. 6, 2013  (KR) .......................... 10-2013-0133991

(51) Int. Cl.
| | |
|---|---|
| *G06F 9/38* | (2006.01) |
| *G06F 7/76* | (2006.01) |
| *H04L 9/06* | (2006.01) |
| *G06F 7/06* | (2006.01) |
| *G06F 9/30* | (2006.01) |

(52) U.S. Cl.
CPC .............. *G06F 9/3887* (2013.01); *G06F 7/06* (2013.01); *G06F 7/76* (2013.01); *H04L 9/0618* (2013.01); *G06F 9/30032* (2013.01); *H04L 2209/08* (2013.01)

(58) Field of Classification Search
CPC .... G06F 9/00; G06F 9/30036; G06F 9/30018; G06F 9/30032; G06F 9/3887; G06F 7/00; G06F 7/76; G06F 15/00; H04L 9/0618
USPC .................................. 712/898; 708/713, 209
See application file for complete search history.

(56) References Cited

U.S. PATENT DOCUMENTS 6,243,808 B1    6/2001  Wang
6,715,066 B1 *  3/2004  Steele, Jr. ............... G06F 7/764
                                                    708/209

(Continued)

FOREIGN PATENT DOCUMENTS

WO      WO 01/89098 A2      11/2001
WO      WO 2011/121795 A1   10/2011

OTHER PUBLICATIONS

Extended European Search Report dated Mar. 23, 2015 in counterpart European Patent Application No. 14192017.3 (7 pages, in English).

*Primary Examiner* — Keith Vicary
*Assistant Examiner* — Courtney Carmichael-Moody
(74) *Attorney, Agent, or Firm* — NSIP Law

(57) ABSTRACT

A method and corresponding apparatus for processing a shuffle instruction are provided. Shuffle units are configured in a hierarchical structure, and each of the shuffle units generates a shuffled data element array by performing shuffling on an input data element array. In the hierarchical structure, which includes an upper shuffle unit and a lower shuffle unit, the shuffled data element array output from the lower shuffle unit is input to the upper shuffle unit as a portion of the input data element array for the upper shuffle unit.

19 Claims, 15 Drawing Sheets

(56) References Cited

U.S. PATENT DOCUMENTS

| | | | |
|---|---|---|---|
| 6,718,492 B1* | 4/2004 | Shavit | G06F 7/762 |
| | | | 712/E9.019 |
| 8,423,752 B2* | 4/2013 | Symes | G06F 9/30032 |
| | | | 712/300 |
| 2004/0254966 A1 | 12/2004 | Sunwoo et al. | |
| 2009/0138534 A1 | 5/2009 | Lee et al. | |
| 2010/0235674 A1* | 9/2010 | Song | G06F 7/32 |
| | | | 713/600 |
| 2013/0007416 A1 | 1/2013 | Macy, Jr. et al. | |

* cited by examiner

METHOD AND APPARATUS FOR SHUFFLING DATA USING HIERARCHICAL SHUFFLE UNITS

CROSS-REFERENCE TO RELATED APPLICATIONS

This application claims the benefit under 35 USC §119(a) of Korean Patent Application No. 10-2013-0133991 filed on Nov. 6, 2013, in the Korean Intellectual Property Office, the entire disclosure of which is incorporated herein by reference for all purposes.

BACKGROUND

1. Field

The following description relates to a method and apparatus for processing a shuffle instruction. The following description also relates to a method and apparatus for processing an N-way single instruction multiple data (SIMD) shuffle instruction.

2. Description of Related Art

A single instruction multiple data (SIMD) instruction is one way to enhance data level parallelism.

An N-way SIMD shuffle instruction includes two input operands. A first operand of the two input operands includes data elements, and a second operand includes selection bits.

The data elements of the first operand are selected by the corresponding selection bits of the second operand. The data elements may correspond to the selection bits, based on a sequential order. For example, a first data element may correspond to a first selection bit.

The data elements of the first operand may be data targeted for shuffling. The selection bits of the second operand may be data indicating a shuffling method.

When the second operand includes "K" number of bits having a "1" value and includes "N–K" number of bits having a "0" value, a "K" number of corresponding data elements of the first operand is associated with the bits having the "1" value, and "N–K" number of corresponding data elements of the first operand is associated with the bits having the "0" value.

The "K" number of data elements corresponding to the "K" number of bits of which the value of the second operand is "1" from among the plurality of data elements of the first operand are determined to be the selected data elements. Thus, a set of selected data elements is determined from the set of data elements in the first operand based on using the corresponding bits as flags. A first occurring "K" number of data elements from among output data elements output as a result of shuffling includes the "K" number of selected data elements, and a subsequently occurring "N–K" number of data elements of the output data elements includes unselected "N–K" number of data elements of the first operand.

A sequential order of the "K" number of selected data elements may be maintained in the output data elements of shuffling. Also, a sequential order of the "N–K" number of unselected data elements may be maintained in the output data elements of shuffling. For example, a shuffle instruction refers to disposing a portion of data elements selected by a control bit from among a plurality of data elements, preceding a remainder of the plurality of data elements. Said differently, a shuffle instruction extracts a subset of selected data elements in order from a set of data elements, and then appends the remaining elements in order following the selected data elements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for processing a shuffle instruction includes shuffle units including an upper shuffle unit and a lower shuffle unit configured in a hierarchical structure, each configured to generate a shuffled data element array by performing shuffling with respect to an input data element array, and wherein the shuffled data element array output from the lower shuffle unit is configured to be input to the upper shuffle unit as a portion of the input data element array of the upper shuffle unit.

The hierarchical structure may be provided as a binary tree.

The input data element array of the upper shuffle unit may be formed by concatenating, based on a sequential order of the lower shuffle unit, the shuffled data element array output from the lower shuffle unit.

The shuffling may output data elements indicated by data selected from the input data element array preceding unselected data elements in the shuffled data element array.

The data elements selected in the shuffling in the lower shuffle unit may also be selected in the upper shuffle unit.

The lower shuffle unit may be configured to output a number indicator indicating a number of data elements selected in the shuffling in the lower shuffle unit with the shuffled data element array output from the lower shuffle unit.

The upper shuffle unit may be configured to process, as the selected data elements, data elements corresponding to the number indicator from earliest occurring data elements in the shuffled data element array output from the lower shuffle unit.

The shuffle units may include a basic shuffle unit corresponding to a leaf node of the hierarchical structure, and a final shuffle unit corresponding to a root node of the hierarchical structure.

The input data element array of the basic shuffle unit may be one of "n" portions of data elements of a single instruction multiple data (SIMD) instruction, the apparatus may receive control bits that are divided for use by the basic shuffle unit, the divided control bits may be a portion of one of the portions divided by the "n" number of control bits of the SIMD instruction, and "n" may be a number of the basic shuffle units from among the shuffle units.

The basic shuffle unit may be configured to generate the shuffled data element array by using the input data element array and the divided control bits, the divided control bits each may have a selection value or an un-selection value, and the basic shuffle unit may be configured to dispose data elements of the input data element array corresponding to a control bit having the selection value preceding data elements corresponding to a control bit having the un-selection value to generate the shuffled data element array.

The basic shuffle unit may be configured to output a number indicator indicating a number of control bits having the selection value from among the input control bits.

The input data element array of the final shuffle unit may be formed by concatenating a first shuffled data element array output from a first lower shuffle unit of the final shuffle unit, and a second shuffled data element array output from a second lower shuffle unit of the final shuffle unit.

The final shuffle unit may be configured to determine first selected data elements and first unselected data elements from the first shuffled data element array based on a first number indicator output from the first lower shuffle unit, and to determine second selected data elements and second unselected data elements from the second shuffled data element array based on a second number indicator output from the second shuffle unit, the final shuffle unit may be configured to output a final shuffled data element array, and the final shuffled data elements array may be configured to include the first selected data elements, the second selected data elements, the first unselected data elements, and the second unselected data elements in sequential order.

The final shuffle unit may be configured to determine a number of data elements corresponding to the first number indicator from an earliest occurring element from the first shuffled data element array to be the first selected data elements, and to determine a number of data elements corresponding to the second number indicator from an earliest occurring data element from the second shuffled data element array to be the second selected data elements.

The shuffle units may further include an intermediate shuffle unit corresponding to an intermediate node of the hierarchical structure.

The input data element array of the intermediate shuffle unit may be formed by concatenating a first shuffled data element array output from a first lower shuffle unit of the intermediate shuffle unit and a second shuffled data element array output from a second lower shuffle unit of the intermediate shuffle unit.

The intermediate shuffle unit may be configured to determine first selected data elements and first unselected data elements from the first shuffled data element array by using a first number indicator output from the first lower shuffle unit, and to determine second selected data elements and second unselected data elements from the second shuffled data element array by using a second number indicator output from the second lower shuffle unit, and the shuffled data element array of the intermediate shuffle unit includes the first selected data elements, the second selected data elements, the first unselected data elements, and the second unselected data elements.

The intermediate shuffle unit may be configured to output a third number indicator, and a value of the third number indicator may be calculated as a sum of the first number indicator and the second number indicator.

The intermediate shuffle unit may be configured to determine a number of data elements corresponding to the first number indicator from an earliest occurring data element from the first shuffled data element array to be the first selected data elements, and to determine a number of data elements corresponding to the second number indicator from an earliest occurring data element from the second shuffled data array to be the second selected data elements.

In another general aspect, a method of processing a shuffle instruction by shuffle units including an upper shuffle unit and a lower shuffle unit configured in a hierarchical structure includes receiving, by each shuffle unit, an input data element array, generating, by each shuffle unit, a shuffled data element array by performing shuffling with respect to the input data element array, and outputting, by the shuffle unit, the generated shuffled data element array, wherein the shuffled data element array output from the lower shuffle unit is configured to be input to the upper shuffle unit as a portion of the input data element array of the upper shuffle unit.

In another general aspect, a basic shuffle apparatus includes a data element re-arrangement unit configured to receive data elements and control bits and to generate re-arranged data element arrays corresponding to shuffling the data elements, and a multiplexer (MUX) configured to select a re-arranged data element array corresponding to the control bits and to output the selected re-arranged data element array as a shuffled data element array.

The basic shuffle apparatus further includes a number indicator generation unit configured to generate a number indicator based on input control bits and to output the generated number indicator.

The number indicator generation unit may determine a value of the number indicator by counting bits having a selection value from among control bits.

The data element re-arrangement unit may generate re-arranged data element arrays for all possible combinations of control bits.

The data element re-arrangement unit may generate re-arranged data element arrays for all non-overlapping combinations of control bits.

Other features and aspects will be apparent from the following detailed description, the drawings, and the claims.

Figure 1:
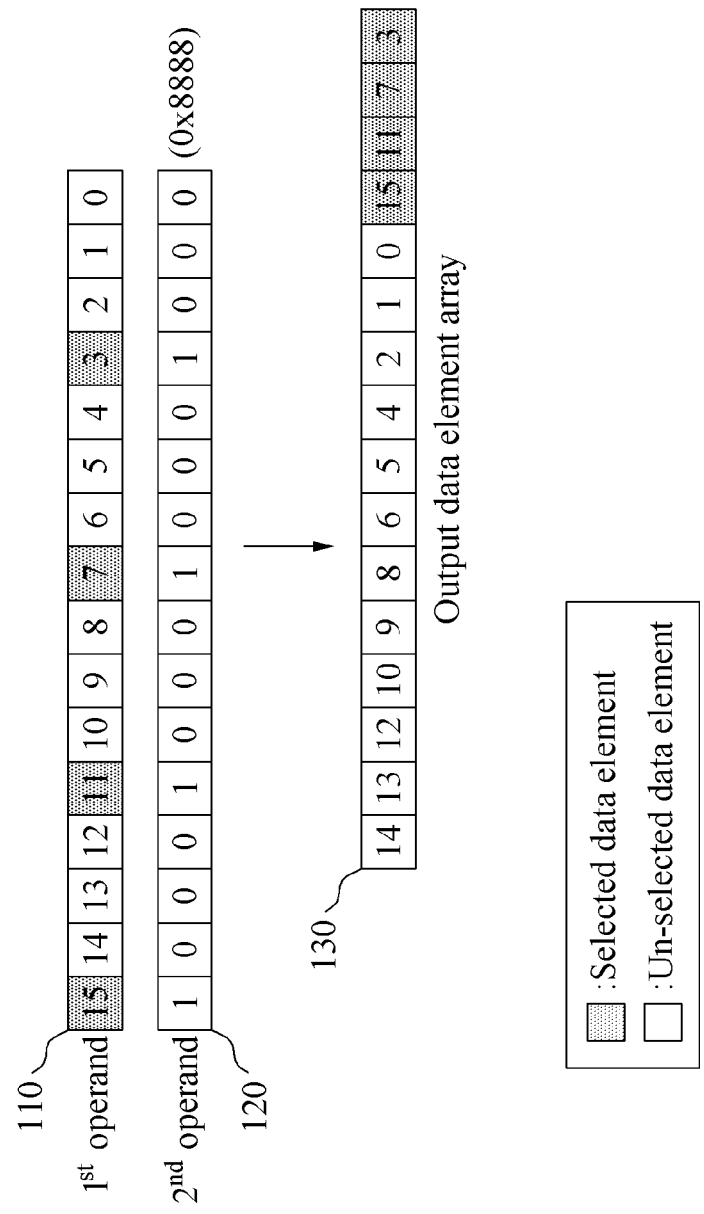
FIG. 1 is a diagram illustrating an example of an N-way single instruction multiple data (SIMD) shuffle instruction.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the Specification, certain features are referred to as including "at least one" of a feature. Such features denote elements where an example either includes one instance of such a feature, or an arbitrary number of multiple instances of that feature. Furthermore, certain features are referred to in the singular or plural form. While such features have been expressed in the singular or plural form for ease and clarity of expression, or to conform with aspects of a particular example, if a feature is expressed in the singular in an example, other examples potentially include plural instances of that feature and if a feature is expressed in the plural in an example, other examples potentially include a singular instances of that feature unless it is absolutely clear from context or specifically stated otherwise. For example, certain elements are described in the plural because there will ordinarily be multiple instances of such an element, but other examples do not exclude a case in which there is only one instance of such an element.

FIG. 1 is a diagram illustrating an example of an N-way single instruction multiple data (SIMD) shuffle instruction.

The N-way SIMD shuffle instruction includes a first operand 110 and a second operand 120.

The first operand 110 refers to a data element array. The data element array includes data elements. Each of the elements in the data element array has a value.

"N" number of data elements are provided in the N-way SIMD shuffle instruction. For example, "N" is an integer greater than "1".

In the example of FIG. 1, "16" data elements of the first operand 110 are indicated by numbers. In this example, the leftmost element in the first operand 110 is indicated by the number "15" and the rightmost element in the first operand 110 is indicated by the number "0". In such an example, the SIMD shuffle instruction of FIG. 1 is a 16-way SIMD instruction.

In such an example, a farthest right data element within the data element array of the first operand 110 is an earliest occurring data element, and a farthest left data element within the data element array is a last occurring data element. Accordingly, the earliest occurring data element has a number "0", and the last occurring data element has a number "15".

The second operand 120 refers to a control bit array. The control bit array includes control bits. "N" control bits are provided in the N-way SIMD shuffle instruction.

When the second operand 120 corresponds to the control bit array, a value of the control bit array as shown in the example of FIG. 1 is a hexadecimal number "0x8888". Such a bit array may be represented by the hexadecimal number "0x8888" because "0x" indicates that the value is a hexadecimal number, and because the bits corresponding to the numeral "8" in a hexadecimal are "1000."

The data elements correspond to the control bits in a sequential order. For example, a first control bit of the control bits is a bit indicating control information with respect to a first data element of the data elements. Likewise, each successive control bit of the control bits is a bit indicating control information for a subsequent data element of the data elements.

The control bit has a predetermined first value or a predetermined second value. The predetermined first value represents one state, and the predetermined second value represents a different state. Hence, each control bit includes a piece of binary information.

In the example of FIG. 1, the first value is represented as binary value "1", and the second value is represented as binary value "0".

The first value is a value that indicates a selection, hereinafter referred to as a "selected value", and the second value is a value that indicates an un-selection, hereinafter referred to as an "un-selected value". A selection indicates that a value that is selected is to be included in a group of selected values that are to be handled together as selected values, while an un-selection indicates that a value that is unselected is not to be included in such a group, and should instead be considered with the other "un-selected values."

In an example, when a value of "K" number of bits is the first value or the selection value from among the "N" number of control bits, a value of "N-K" number of bits is the second value or the un-selection value. As used herein, "K" is an integer greater than "0" and less than "N". Thus, of the control bits, some are allocated to indicate selection and some are allocated to indicate un-selection. The allocated control bits specify which of the data items are allocated between these two indications.

For the data elements of the data element array, shuffling refers to an operation of arranging predetermined data elements of the data elements, preceding a remainder of the data elements. For example, the predetermined data elements moved to a front are referred to as first data elements, and remaining elements that are not moved to the front are referred to as second data elements.

Each of the control bits is used to determine a data element to be selected as one of the first data elements from among the data elements of the data element array. For example, the control bits designate data elements to be moved to a front within the data element array from among the data elements of the data element array by shuffling.

A data element of which a corresponding control bit value is the first value is selected to be the first data element. Here, the first value indicates that the data element is to be selected.

For example, in FIG. 1, the control bits having the first value corresponds to a fourth control bit which is in a fourth position from a far right, an eighth control bit, a twelfth control bit, and a sixteenth control bit. Accordingly, the first data elements correspond to a fourth data element, an eighth data element, a twelfth data element, and a sixteenth data element, corresponding to the control bits that are selected data elements.

Thus, the fourth data element, the eighth data element, the twelfth data element, and the sixteenth data element within the data element array of the first operand 110 are moved to the front of the destination array in an output array 130. They are followed by the un-selected elements. They are designated as such by their control bits having the second value.

For example, the shuffling refers to an operation or a calculation including disposing "K" number of selected data elements corresponding to the "K" number of control bits having the first value from among the data elements of the data element array, preceding "N–K" number of unselected data elements corresponding to the "N–K" number of bits having the second value.

The output 130 is a data element array produced subsequent to completion of the shuffling. For example, the output 130 includes a shuffled data element array output as a result of the shuffling as discussed above.

In an example, a relative sequential order amongst the first data elements and a relative sequential order amongst the second data elements is maintained. Hence the first data elements maintain their previously existing relative sequential order as a group, and the second data elements maintain their previously existing relative sequential order as a group.

In further descriptions to be provided later, the shuffling is performed hierarchically or recursively.

The N-way SIMD shuffle instruction is implemented by a complete N-way switch, and uses N clock cycles for shifting. When the N-way shuffle instruction is implemented by such a complete N-way switch, an extensive area of the processor is used. Also, in a processor operating at a high clock frequency, the implementation by the complete N-way switch potentially has an effect on processor functionality. When the N-way shuffle instruction is implemented based on a method of verifying a plurality of bits of the second operand 120, such implementation potentially occupies an N clock cycles, and affects a performance of the processor.

Figure 2:
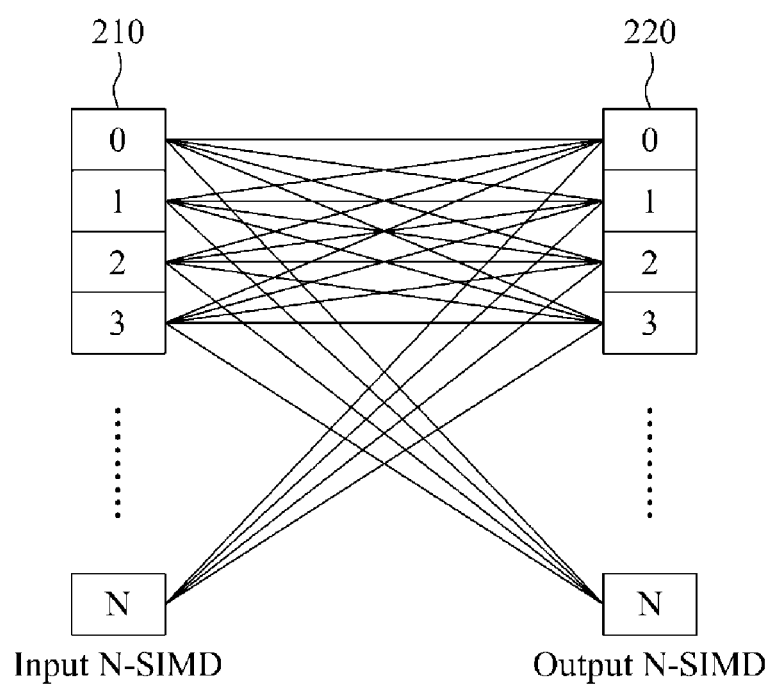
FIG. 2 is a diagram illustrating an example of an input and an output of an N-way SIMD shuffle instruction.

FIG. 2 is a diagram illustrating an example of an input and an output of an N-way SIMD shuffle instruction.

The N-way shuffle instruction is similar to a cross bar switch, despite some exceptional cases. As discussed above, an N-way shuffle instruction provides a way to map elements from inputs to outputs. For example, in the example of FIG. 2 data elements of input N-SIMD 210 and data elements of output N-SIMD 220 are associated via a full inter-connection.

In FIG. 2, an interconnection available between an input of the N-way SIMD shuffle instruction and an output of the N-way SIMD shuffle instruction is illustrated. The interconnection refers to data movement that occurs from the input SIMD to the output SIMD. Via the full interconnection, a predetermined element of the input data elements moves to a predetermined element of the output data elements. Such a characteristic that particular elements on the input side correspond to particular elements on the output side is a similarity between the N-way SIMD shuffle instruction, and a cross bar switch and complexity aspects of a cross bar switch.

Figure 3:
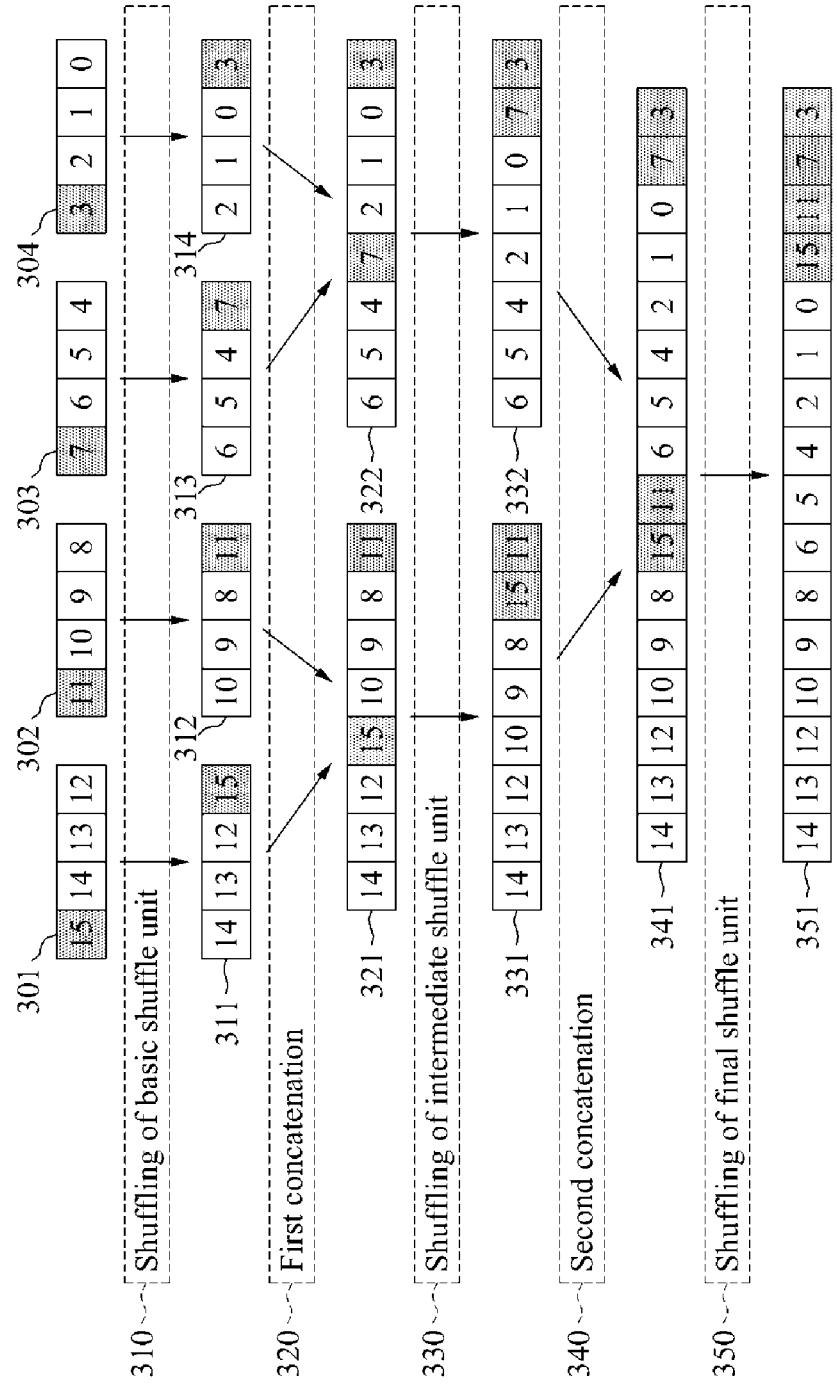
FIG. 3 is a diagram illustrating an example of hierarchical shuffling.

FIG. 3 is a diagram illustrating an example of hierarchical shuffling.

In the hierarchical shuffling, an N-way SIMD shuffle instruction is divided into multiple stages. Shuffling is performed in each of the multiple stages. Shuffled data is provided to a subsequent stage along with an appropriate signal for controlling subsequent shuffling. "$\log_2 N$" number of stages is required for performing the N-way SIMD shuffle instruction. When a value of "N" does not correspond to radix of "2", "$\log_2 L$" number of stages is required for performing the N-way SIMD shuffle instruction. "L" is a least value from among values of radix of "2" greater than "N". Said another way, L is an integer ceiling of N in case "$\log_2 N$" is not an integer. For example, suppose that N is 48. Since "$\log_2 N$" is between 5 and 6 since 48 is between 32, which is $2^5$ and 64, which is $2^6$. Hence, L is 6, which is the result of rounding up "$\log_2 N$" in this example.

In FIG. 3, a number within a box indicates a number of a data element. A hashed box indicates that a data element is selected. An empty box indicates that a data element is un-selected. For example, the data element indicated by the hashed box is the selected data element, and the data element indicated by the empty box is the un-selected data element.

Portions 301, 302, 303, and 304 of all data elements are illustrated in the example of FIG. 3. Each of the portions 301, 302, 303, and 304 is a data element array that includes part of the data elements. For example, the portions 301, 302, 303, and 304 correspond to divided portions of the set of all data elements, respectively.

When a number of the all data elements is not a radix of "2", a number of "0" values corresponding to a number satisfying to be radix of "2" may be added. Thus, the number of data elements is padded so that the number is "2" raised to a positive integral exponent. For example, when a number of data elements of an SIMD instruction is "24", "8" dummy data elements may be inserted. As a result, the total number of elements is "32", and as a result, the total of number of elements is $2^5=32$. Control bits corresponding to the "8" inserted dummy data elements have un-selection values, as they aid in the shuffling but do not constitute actual data elements. Likewise, when the number of the data elements of the SIMD instruction is insufficient to supply data to all of the basic shuffle units, dummy values are inserted into an input data element array of a basic shuffle unit lacking a sufficient quantity of data elements. In such a case, control bits corresponding to the inserted dummy values are set to have un-selection values. Also, in a final shuffled data element array output from a final shuffle unit, a number of data elements corresponding to an original number of data elements of the SIMD instruction is extracted as an actual result. A number of data elements corresponding to a number of dummy values added to aid in processing is discarded from an end portion of the final shuffled data element array. Thus, dummy values aid in processing, but are removed to prevent extraneous information from being included in the actual output.

Shuffling is performed on each of the portions 301, 302, 303, and 304 of the all data elements by shuffling 310 of a basic shuffle unit.

Shuffled portions 311, 312, 313, and 314 are results of the portions 301, 302, 303, and 304 of the all data elements being shuffled individually. Selected data elements are moved to a front of the data element array in the shuffled portions 311, 312, 313, and 314. Hence, after shuffling the shuffled portions 311, 312, 313, and 314 each of the portions includes elements from the first group, in order, followed by elements form the second group, in order.

The shuffled portions 311, 312, 313, and 314 are concatenated in combinations of two portions through a first concatenation 320. In the first concatenation 320, a first concatenated portion 321 is generated through by concatenating the first shuffled portion 311 and the second shuffled portion 312. A second concatenated portion 322 is generated by concatenating the third shuffled portion 313 and the fourth shuffled portion 314.

Shuffling is performed on each of the first concatenated portion 321 and the second concatenated portion 322 by shuffling 330 of an intermediate shuffle unit.

A first shuffled concatenated portion 331 is a result of the shuffling of the first concatenated portion 321. A second shuffled concatenated portion 332 is a result of the shuffling of the second concatenated portion 322.

As shown in FIG. 3, selected data elements are moved to a front of the data element array in the first shuffled concatenated portion 331. For example, elements "15" and "11" are both moved to the front of the first shuffled concatenated portion 331. Also, selected data elements are moved to a front of the data element array in the second shuffled concatenated portion 332.

The first shuffled concatenated portion 331 and the second shuffled concatenated portion 332 are concatenated by the second concatenation 340. A concatenated data array 341 is a result of the first shuffled concatenated portion 331 and the second shuffled concatenated portion 332 being concatenated by the second concatenation 340.

Shuffling is performed on the concatenated data array 341 by shuffling 350 of a final shuffle unit.

A shuffled data array 351 is a result of the concatenated data array 341 being shuffled.

The shuffled data array 351 includes all data elements of the portions 301, 302, 303, and 304. Also, the selected data elements of the portions 301, 302, 303, and 304 are all moved to a front of the data element array in the shuffled data array 351. As discussed above, in the example of FIG. 3, ordering of selected data elements and un-selected data elements is preserved.

Also, throughout all the portions 301, 302, 303, and 304, a sequential order of the selected data elements is maintained in the shuffled data array 351, and a sequential order of the un-selected data elements is also maintained in the shuffled data array 351.

Figure 4:
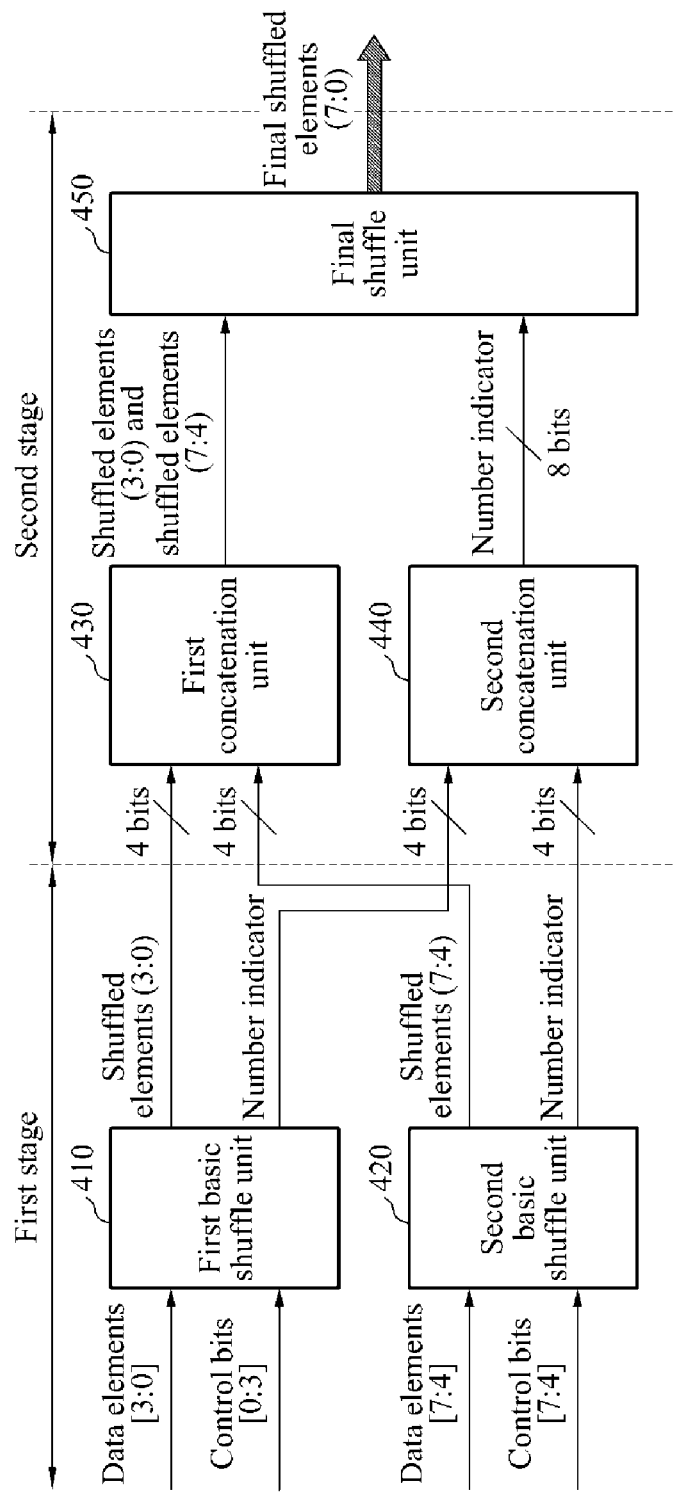
FIG. 4 is a diagram illustrating an example of a configuration of an apparatus for processing a shuffle instruction.

FIG. 4 is a diagram illustrating an example of a configuration of an apparatus for processing a shuffle instruction.

The apparatus for processing the shuffle instruction includes shuffle units configured in a hierarchical structure. The hierarchical structure is provided in a form of a tree. In an example, the tree is a binary tree.

In the example of FIG. 4, a first stage refers to shuffling performed by a basic shuffle unit corresponding to a leaf node in the hierarchical structure of shuffle units. A second stage refers to shuffling performed by a final shuffle unit corresponding to a root node of the hierarchical structure of shuffle units.

In FIG. 4, a first basic shuffle unit 410, a second basic shuffle unit 420, and a final shuffle unit 450 are illustrated as being the shuffle units.

The shuffle units include the basic shuffle unit corresponding to the leaf node of the hierarchical structure, and the final shuffle unit corresponding to the root node of the hierarchical structure. In this example, the first basic shuffle unit 410 and the second basic shuffle unit 420 are the basic shuffle units, respectively.

Each of the shuffle units generates a shuffled data element array by performing shuffling on an input data element array that is input to each of the shuffle units.

The shuffling refers to disposing selected data elements indicated by predetermined data indicators from among data elements in the input data element array preceding un-selected data elements within the data element array.

Also, in an upper shuffle unit and lower shuffle units connected in the hierarchical structure, a shuffled data element array output from each of the lower shuffle units is input to the upper shuffle unit as an input data element array.

For example, in FIG. 4, the final shuffle unit 450 corresponds to an upper shuffle unit of the first basic shuffle unit 410 and the second basic shuffle unit 420. The first basic shuffle unit 410 and the second basic shuffle unit 420 are lower shuffle units of the final shuffle unit 450. The terms "upper" and" lower" refer to the relationship between the shuffle units in a hierarchical structure, such as a tree as discussed earlier.

In another example, a first shuffled data element array output from the first basic shuffle unit 410 and a second shuffled data element array output from the second basic shuffle unit 420 are input to the final shuffle unit 450 as portions of the input data element array of the final shuffle unit 450.

The input data element array of the upper shuffle unit is a group of shuffled data element arrays that are output from lower units.

The input data element array of the upper shuffle unit is concatenated together based on a sequential order of the elements include in the lower units of the shuffled data element arrays output from the lower units.

For example, the input data element array of the final shuffle unit 450 is a concatenation of the first shuffled data element array that is output from the first basic shuffle unit 410 and the second shuffled data element array that is output from the second basic shuffle unit 420. With respect to the input data element array, the first shuffled data element array is disposed into the input data element array to precede the second shuffled data element array. Such concatenation is performed, in this example, by a first concatenation unit 430.

The apparatus for processing the shuffle instruction further includes data element array concatenation units. Here, the data element array concatenation units each generate a single data array by concatenating input arrays, and output the generated data array.

For example, the concatenation unit generates a single input data element array by concatenating shuffled data element arrays output from shuffle units, and outputs the generated input data element array including the results of the concatenation.

In the example of FIG. 4, the first concatenation unit 430 is illustrated as a concatenation unit that generates an input data element array for the final shuffle unit 450.

As described in the foregoing with reference to FIG. 3, selected data elements involved in shuffling in lower shuffle units from among data elements in an input data element array are selected in shuffling in an upper shuffle unit. Accordingly, shuffling with respect to predetermined data elements is performed continuously by a series of shuffle units during hierarchical shuffling.

The continuous shuffling is performed using a number indicator.

Shuffle units other the final shuffle unit 450 from among the shuffle units output a number indicator along with a shuffled data element array to be used by subsequent shuffle units. A number of bits included in the number indicator may vary based on a level in the hierarchical structure.

The number indicator indicates a number of selected data elements in each of the shuffle units from among data elements of the data element arrays output from each of the shuffle units. For example, the data elements of an input data element array input to each of the shuffle units are split into selected data elements and un-selected data elements. Hence, a number of selected data elements in the shuffle units is indicated by the number indicator.

In a relationship between the upper shuffle unit and the lower shuffle units, each of the lower shuffle units generates and outputs the number indicator that is relevant to its operation. The number indicator indicates a number of data elements selected during shuffling in each of the lower shuffle units from among the data elements of the shuffled data element array output from each of the lower shuffle units.

The upper shuffle unit processes a number of data elements corresponding to a number indicated by the number indicator as selected data elements. The upper shuffle unit starts with earliest occurring data elements from among the data elements of the shuffled data element array output from each of the lower shuffle units.

For example, information about the selected data elements in the lower shuffle units is transferred to the upper shuffle unit via the number indicator, as discussed.

Number indicators output from the lower shuffle units are input to the upper shuffle unit. Alternatively, number indicators output from the lower shuffle units are input to the upper shuffle unit as a combined, single input number indicator.

The input number indicator is obtained through the number indicators received from the lower shuffle units being concatenated into being a single input number indicator. A concatenation unit generates a single input number indicator by concatenating number indicators output from shuffle units, and outputs the generated input number indicator.

In the example of FIG. 4, a second concatenation unit 440 is illustrated as a concatenation unit that also generates an input number indicator.

An upper shuffle unit identifies selected data elements from among data elements of shuffled data element arrays transferred to it from lower shuffle units by processing the input number indicator to determine which elements are to be transferred. Alternatively, the upper shuffle unit identifies the selected data elements from among the data elements of an input data element array by using the input number indicator. Hence, the input number indicator identifies which elements are selected elements, and this information is used to identify selected elements, either by identifying the elements prior to receipt by the upper shuffle unit, or by receiving all elements by the upper shuffle unit and subsequently isolating the selected elements.

An input data element array of a basic shuffle unit is one of the portions of an SIMD instruction that is divided into "n" number of data elements. The data elements of the SIMD instruction are the first operand 110 described with reference to FIG. 1 in the foregoing. As used in this example, "n" is an integer greater than "1". Also, "n" is a number of basic shuffle units from among the shuffle units.

For example, an input data element array of the first basic shuffle unit 410 is a first portion of the divided data elements of the SIMD instruction. In the example of FIG. 4, the first portion includes elements, from among the data elements of the SIMD instruction, starting from a data element having a "0" index value to a data element having a "3" index value. In the example of FIG. 4, "(x:y)" with respect to the data elements indicates from a data element having a "y" index value to a data element having an "x" index value. Hence, the first portion is labeled "(3:0)".

The index indicates a sequential order in the data element array of the data elements. The index value being "0" indicates that a data element is an earliest occurring data element within the data element array. Each successive index value indicates that a corresponding data element is a successive data element within the data element array.

Divided control bits are input to the basic shuffle unit. The divided control bits are portions of control bits of an SIMD instruction that is divided into "n" numbers. The control bits of the SIMD instruction correspond to the second operand 120 described in the foregoing with reference to FIG. 1. Hence, there are "n" control bits corresponding to the "n" numbers.

For example, control bits input to the first basic shuffle unit 410 are a first portion of the divided control bits of the SIMD instruction. In FIG. 4, the first divided portion includes bits, from among the control bits of the SIMD instruction, including a control bit having a "0" index value to a control bit having a "3" index value. In FIG. 4, "(x:y)" with respect to the control bits indicates from a control bit having a "y" index value to a control bit having an "x" index value.

The index indicates a sequential order of the control bits. The index value being "0" indicates that a control bit is an earliest occurring control bit among the control bits.

The basic shuffle unit generates a shuffled data element array based on the input data element array and the divided control bits.

Figure 5:
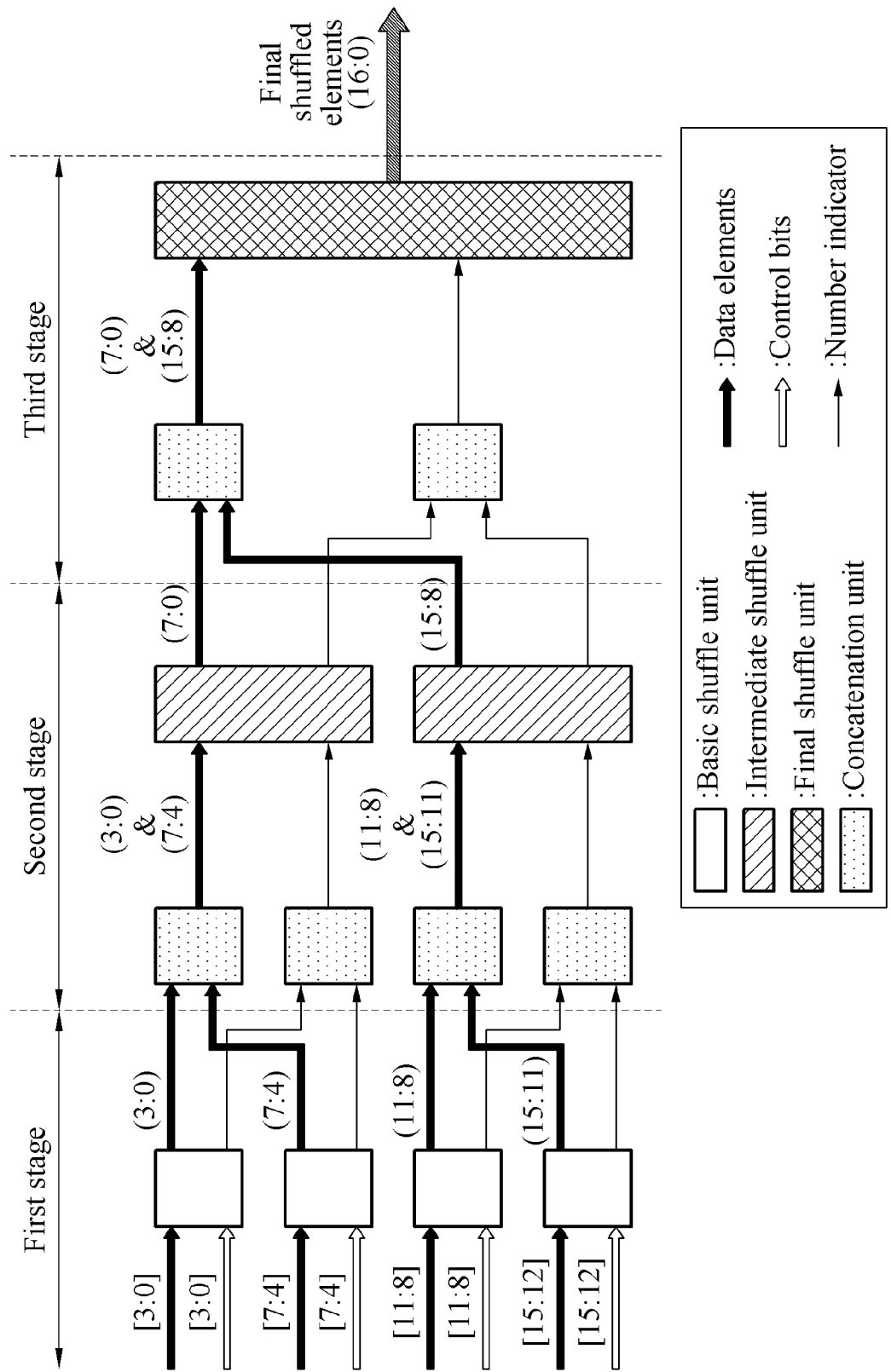
FIG. 5 is a diagram illustrating an example of a configuration of an apparatus for processing a shuffle instruction including an intermediate shuffle unit.

As discussed, each of the divided control bits has a selection value or an un-selection value. The basic shuffle unit generates the shuffled data element array by disposing data elements corresponding to a control bit having the selection value with respect to data elements of the input data element array, preceding data elements corresponding to a control bit having the un-selection value. In FIG. 5 the shuffled data element array is referred to as "shuffled elements". "(x:y)" with respect to the shuffled elements indicates a shuffled data element array that is a result of data elements being shuffled from a "y-th" position to an "x-th" position based on an index value.

The basic shuffle unit outputs a number indicator indicating a number of control bits representing a selection of elements from among input control bits.

Based on examples, the number indicator is expressed in various ways. For example, the number indicator is expressed as an integer value. Also, the number indicator is expressed as a binary string or an array of binary values. When the number indicator is the binary string or the array of binary values, one bit of the number indicator has a selection value, and remaining bits have an un-selection value. A position of a bit having the selection value from among the plurality of bits of the number indicator indicates a number of the selected data element. For example, when values of the bits are "1000", the value of the plurality of bits indicates that the number of the selected data elements is "4". When the value of the plurality of bits is "0001", the value of the plurality of bits indicates that the number of the selected data elements is "1". When the value of the plurality of bits is "0000", the value of the plurality of bits indicates that the selected data elements are absent.

Bits of number indicators output from lower shuffle units are concatenated by a concatenation unit. For example, in FIG. 4, a number indicator output from the first basic shuffle unit 410 and a number indicator output from the second basic shuffle unit 420 become a number indicator of "8" bits by being concatenated by the second concatenation unit 440. The final shuffle unit 450 identifies selected data elements, for example, elements to be moved to be a front of a data array by a selection, in a lower shuffle unit form among data elements of an input data element array based on the input number indicators of "8" bits.

The input data element array of the final shuffle unit is the result of concatenating a first shuffled data element array output from a first lower shuffle unit of the first shuffle unit and a second shuffled data element array output from a second lower shuffle unit of the final shuffle unit. For example, shuffled data elements output from the first concatenation unit 430 are a concatenation of a shuffled element array output from the first basic shuffle unit 410 and a shuffled element array output from the second basic shuffle unit 420. The first lower shuffle unit and the second lower shuffle unit are lower shuffle units of the final shuffle unit.

The final shuffle unit determines first selected data elements and first un-selected data elements from among the first data elements of the first shuffled data element array based on a first number indicator output from a first lower shuffle unit, and determines second selected data elements and second un-selected data elements from among the second data elements of the second shuffled data element array based on a second number indicator output from a second lower shuffle unit.

The final shuffle unit outputs a final shuffled data element array. The final shuffled data element array in FIG. 4 is abbreviated as "final shuffled elements". "(x:y)" with respect to the final shuffled data element array indicates a shuffled data element array which is a result of data elements being shuffled from a "y-th" position to an "x-th" position based on an index value.

The final shuffled data element array includes first selected data elements, second selected data elements, first un-selected data elements, and second un-selected data elements in a sequential order. Accordingly, the final shuffled data element array refers to a result of divided portions of data elements of an SIMD instruction input to basic shuffle units being integrated into an entire shuffled group through hierarchical shuffling.

FIG. 5 is a diagram illustrating an example of a configuration of an apparatus for processing a shuffle instruction including an intermediate shuffle unit.

Referring to FIG. 5, constituent elements of the apparatus for processing the shuffle instruction are indicated by boxes, and are distinguished from one another by differing patterns inside the boxes. Data or information transmitted between the constituents is illustrated as an arrow. Different types of data are distinguished by differing shapes of the arrows.

In FIG. 5, a first stage refers to shuffling performed by a basic shuffle unit, where the basic shuffling corresponds to a leaf node of a hierarchical structure. A second stage refers to shuffling performed by an intermediate shuffle unit, where the intermediate shuffling corresponds to an intermediate node of the hierarchical structure. A third stage refers to shuffling performed by a final shuffle unit, wherein the final shuffling corresponds to a root node of the hierarchical structure.

In FIG. 5, the intermediate node is illustrated to construct a single level of the hierarchical structure. However, dissimilar to the example illustrated in FIG. 5, when a number of the basic shuffle unit is greater than "8", the intermediate node constructs levels of the hierarchical structure, rather than including only a single level. When a number of stages is a total of "m", the first stage is performed by the basic shuffle units, the second through "(m−1)-th" stages are performed by the intermediate shuffle units corresponding to each of the stages from among intermediate shuffle units, and an "m-th" stage is performed by the final shuffle unit. "m" is an integer greater than "3", in that there is always a first stage and a third stage, and it is only relevant to include multiple constituent stages in the second stage in situations where "m" is an integer greater than "3."

In the example of FIG. 5, shuffle units include the basic shuffle unit corresponding to the leaf node of the hierarchical structure, the intermediate shuffle unit corresponding to the intermediate node of the hierarchical structure, and the final shuffle unit corresponding to the root node of the hierarchical structure.

An input data element array of the intermediate shuffle unit the result of concatenating a first shuffled data element array output from a first lower shuffle unit of the intermediate shuffle unit and a second shuffled data element array output from a second lower shuffle unit of the intermediate shuffle unit. The first lower shuffle unit and the second lower shuffle unit are lower shuffle units of the intermediate shuffle unit, respectively.

The intermediate shuffle unit determines first selected data elements and first unselected data elements from among first data elements of the first shuffled data element array based on a first number indicator output from the first lower shuffle unit. Likewise, the intermediate shuffle unit determines second selected data elements and second unselected data elements from among second data elements of the second shuffled data element array based on a second number indicator output from the second lower shuffle unit.

A shuffled data element array of the intermediate shuffle unit corresponds to a data element array including the first selected data elements, the second selected data elements, the first unselected data elements, and the second unselected data elements in a sequential order.

The intermediate shuffle unit outputs a third number indicator. A value of the third number indicator is calculated as a sum of the first number indicator and the second number indicator. Such a sum is used as the third number indicator because the inputs to the intermediate shuffle unit are concatenated to output the third number indicator.

The intermediate shuffle unit determines a number of data elements corresponding to a number indicated by the first number indicator from first occurring data elements from among the first data elements of the first shuffled data element array to be the first selected data elements. Likewise, the intermediate shuffle unit determines a number of data elements corresponding to a number indicated by the second number indicator from first occurring data elements from among the second data elements of the second shuffled data element array to be the second selected data elements.

Figure 6:
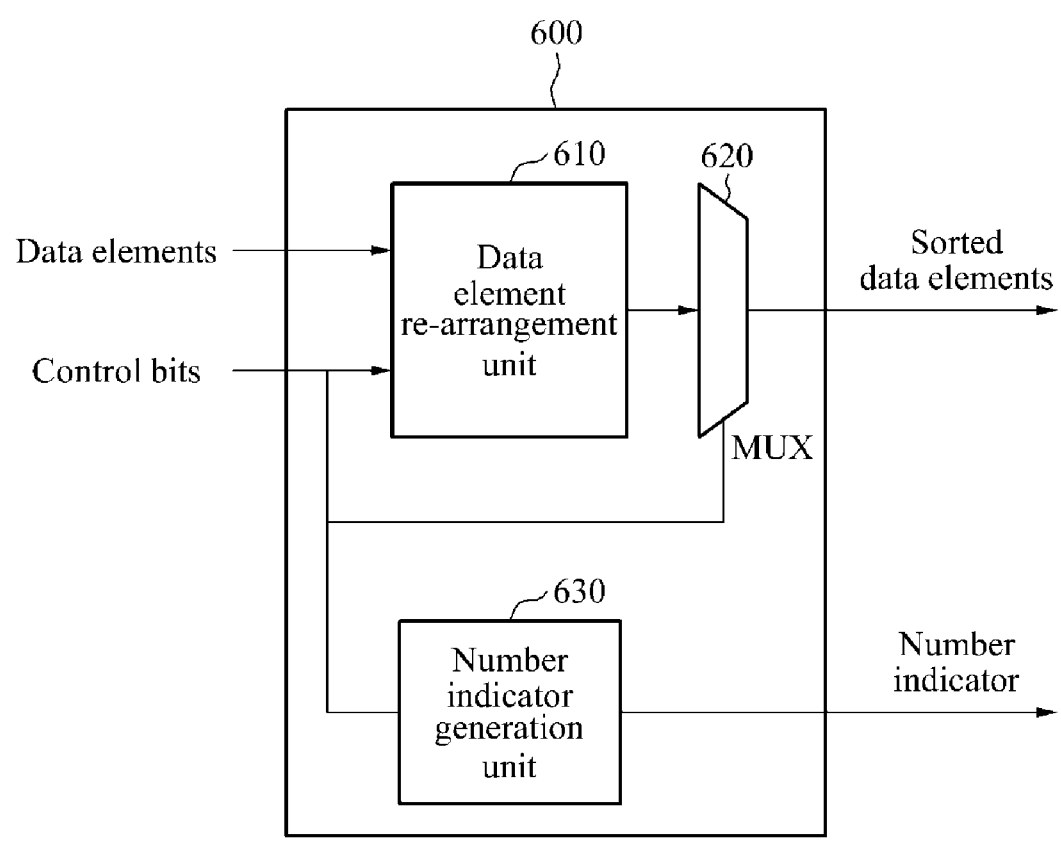
FIG. 6 is a diagram illustrating an example of a structure of a basic shuffle unit.

FIG. 6 is a diagram illustrating an example of a structure of a basic shuffle unit 600.

Referring to FIG. 6, the basic shuffle unit 600 includes a data element re-arrangement unit 610, a multiplexer (MUX) 620, and a number indicator generation unit 630.

The data element re-arrangement unit 610 generates a data re-arrangement block by re-arranging data elements of an input data element array provided to the basic shuffle unit 600. The data re-arrangement block includes re-arranged data element arrays.

The re-arranged data element arrays each refer to an array corresponding to a result of a sequential order of the data elements of the input data element array being changed. For example, the data element re-arrangement unit 610 generates re-arranged data element arrays corresponding to array results generated by performing shuffling on the data elements based on the data elements of the input data element array. The re-arranged data element arrays are generated with respect to all instances of differing shuffling applicable to the data elements. As used herein, the differing shuffling refers to shuffling operations having differing selected data elements.

The MUX 620 selects a re-arranged data element array corresponding to control bits from among the re-arranged data elements. The MUX 620 then outputs the selected re-arranged data element array as a shuffled data element array of the basic shuffle unit 600. For example, data elements of the shuffled data element array correspond to data elements sorted by shuffling. Accordingly, the MUX 620 outputs the sorted data elements as the shuffled data element array.

The number indicator generation unit 630 generates a number indicator that is based on the input control bits, and outputs the generated number indicator to express the input control bits.

The number indicator generation unit 630 determines a value of the number indicator by counting bits having a selection value from among control bits.

Figure 7:
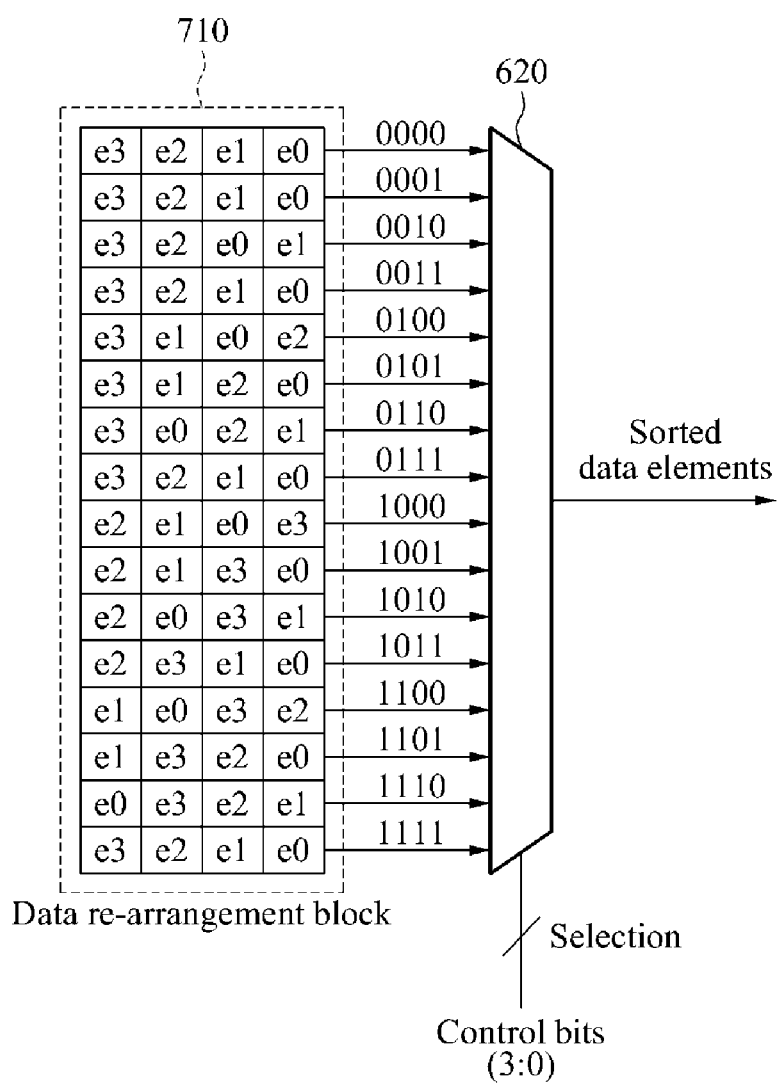
FIG. 7 is a diagram illustrating an example of a data re-arrangement block and a selection by a multiplexer (MUX).

FIG. 7 is a diagram illustrating an example of a data re-arrangement block 710 and a selection by a MUX.

Referring to the example of FIG. 7, a column of the data re-arrangement block 710 indicates a single re-arranged data element array. A row of the data re-arrangement block 710 indicates data elements in the re-arranged data element array. "e0", "e1", "e2", and "e3" indicate data elements of an input data element array in a sequential order. For example, "e0" corresponds to an earliest occurring data element within the input data element array, and "e3" corresponds to a final occurring data element within the input data element array.

As shown in FIG. 7, positions of the data elements of the input data element array are shifted within the re-arranged data element array.

The re-arranged data element array refers to sorted data elements to be output when control bits have predetermined values.

For example, when a value of the control bits is "0000", all of the data elements are un-selected. Accordingly, shuffling is completed while a sequential order of the data elements is maintained within the input data element array. Also, in this example, the input data element array with the sequential order maintained is output as the shuffled data element array.

In another example, when a value of the control bits is "0010", "e1" is selected. Accordingly, "e1" is moved to a front of a data element array. Accordingly, when a value of the control bits input to the MUX 620 is "0010", the MUX 620 selects a third re-arranged data element array of the data re-arrangement block 710 corresponding to "0010", and the selected third re-arranged data element array is output as the shuffled data element array.

Figure 8:
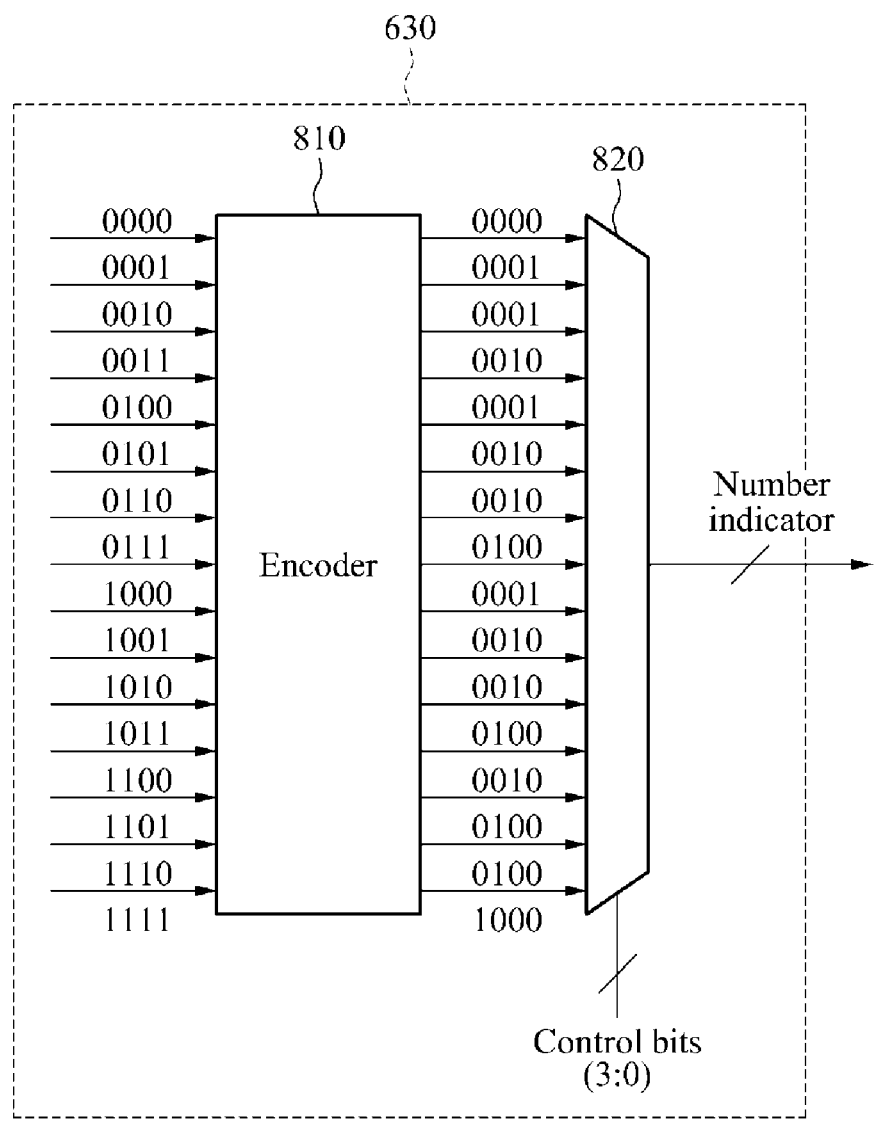
FIG. 8 is a diagram illustrating an example of a structure of a number indicator generation unit.

FIG. 8 is a diagram illustrating an example of a structure of a number indicator generation unit 630.

Referring to FIG. 8, the number indicator generation unit 630 includes an encoder 810 and a MUX 820.

The encoder 810 encodes input bit arrays into a number of bits having a selection value based on the input bit array being input. The encoder 810 refers to a one hot encoder or a binary encoder. In digital circuits, one-hot refers to a group of bits among which the legal combinations of values are only those with a single high, or "1," bit and all the others low, or "0," bits. A binary encoder uses numbers in base 2.

For example, when an input bit array is "0000", a number of bits having "1" selection value is "0". When an input bit array is "1001", the number of bits having "1" selection value is "2".

The number of bits having a value "1" is represented by a position of a bit having the value "1" from among output bit arrays such that the position of that bit indicates how many selected bits are included in the input bit array. For example, when the number of bits having the value "1" is "0", a value of an output bit array is "0000". When the number of bits having the value "1" is "1", the value of the output bit array is "0001". For example, a position within the output bit array having the value "1" indicates a number of bits having the selection value from among the input bit array. Likewise, when the number of bits having the value "1" is "3", the value of the output bit array is "0100".

The encoder 810 generates output bit arrays for all possible input bit arrays. For example, in the example of FIG. 8, there are "4" elements in the input bit arrays, so FIG. 8 shows all "16" combinations of possible inputs to the encoder 810.

The MUX 820 selects a single output bit array from among the output bit arrays input to the MUX 820 by the encoder 810, based on a value of control bits. For example, when a value of the control bits is "0000", the MUX 820 selects a first output bit array corresponding to an input bit array "0000" from among the output bit arrays. The MUX 820 outputs the selected output bit arrays as a number indicator, to be used as discussed above.

Figure 9:
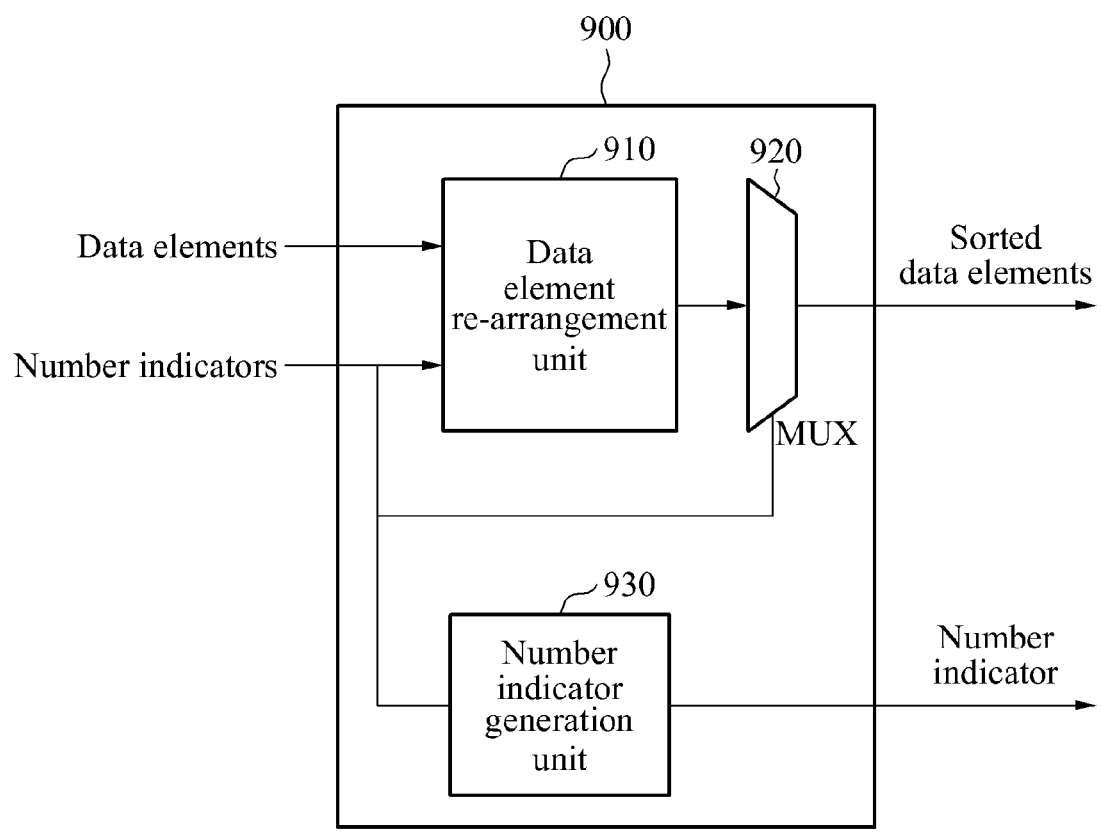
FIG. 9 is a diagram illustrating an example of a structure of an intermediate shuffle unit.

FIG. 9 is a diagram illustrating an example of a structure of an intermediate shuffle unit 900.

Referring to the example of FIG. 9, the intermediate shuffle unit 900 includes a data element re-arrangement unit 910, a MUX 920, and a number indicator generation unit 930.

The data element re-arrangement unit 910 generates a data re-arrangement block by re-arranging data elements of an input data element array. The data re-arrangement block includes re-arranged data element arrays.

The re-arranged data element array refers to an array corresponding to a result of a sequential order of the data elements of the input data element array being changed. For example, the data element re-arrangement unit 910 generates re-arranged data element arrays corresponding to array results generated by performing shuffling on the data elements based on the data elements of the input data element array. The re-arranged data element arrays are generated with respect to all instances of differing shuffling to be applied to the data elements. As used herein, the differing shuffling refers to shuffling having differing selected data elements.

The MUX 920 selects a re-arranged data element array corresponding to control bits from among the re-arranged data elements. The MUX 920 then outputs the selected re-arranged data element array as a shuffled data element array of the basic shuffle unit 900. Data elements of the shuffled data element array corresponds to data elements sorted by shuffling. Accordingly, the MUX 920 outputs the sorted data elements as the shuffled data element array.

The number indicator generation unit 930 generates a number indicator based on input control bits, and outputs the generated number indicator.

The number indicator generation unit 930 determines a value of the number indicator by calculating a sum of the values input for the number indicator.

Figure 10:
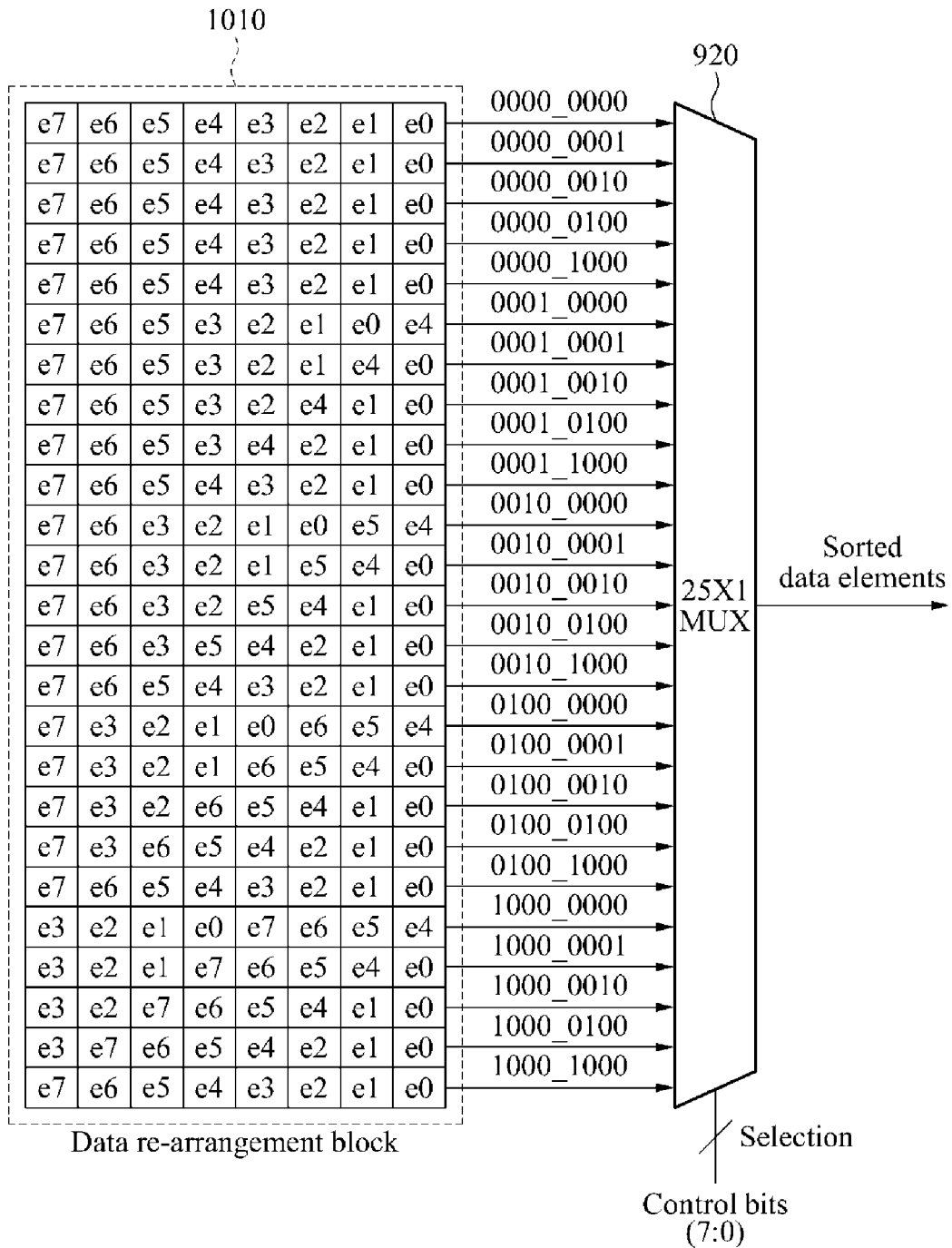
FIG. 10 is a diagram illustrating an example of a data re-arrangement block and a selection by a MUX.

FIG. 10 is a diagram illustrating an example of a data re-arrangement block 1010 and a selection by a MUX 920.

Referring to FIG. 10, a column of the data re-arrangement block 1010 indicates a single re-arranged data element array. A row of the data re-arrangement block 1010 indicates data elements within the re-arranged data element array. "e0" through "e7" indicate data elements of an input data element array in a sequential order. In the example of FIG. 10, "e0" corresponds to an earliest occurring data element within the input data element array, and "e7" corresponds to a last occurring data element within the input data element array.

As shown in FIG. 10, a position of the data elements of the input data element array are shifted within the re-arranged data element array.

The re-arranged data element array refers to sorted data elements to be output when control bits have predetermined values.

For example, when the values of input number indicators are "0000" and "0000", all data elements are un-selected. Accordingly, shuffling is completed in which a sequential order of the data elements is maintained within the input data element array. Also, the input data element array with the sequential order maintained as output as a shuffled data element array.

For example, when a first input indicator value of the input number indicators is "0010", and a second input indicator value of the input number indicators is "0000", "e0" and "e1" are selected. Accordingly, "e0" and "e1" are moved to a front of a data element array. However, no actual moving occurs because "e0" and "e1" are already disposed in the front of the data element array in a first position. Accordingly, when a value of the first input indicator value of the input number indicators input to the MUX 920 is "0010", and the second input indicator value of the input number indicators is "0000", the MUX 920 selects a third re-arranged data element array of the data re-arrangement block 1010 corresponding to "0000_0010", and the selected third re-arranged data element array is output as a shuffled data element array.

The input number indicators have a single concatenated value. The concatenated number indicators are illustrated as control bits in the example of FIG. 10.

For example, when a first input indicator value of the input number indicators is "0001", and a second input indicator value is "0001", "e0" and "e4" are selected. Accordingly, "e0" and "e4" are moved to the front of the data element array. "e0" remains at the front of the data element array, and "e4" moves to a second occurring position of the data element array because a sequential order of selected data elements is maintained subsequent to the moving. Consequently, when the first input indicator value of the input number indicators input to the MUX 920 is "0001", and the second input indicator value is "0001", the MUX 920 selects a seventh re-arranged data element array of the data re-arrangement block 1010 corresponding to "0001_0001", and the selected seventh re-arranged data element array is output as a shuffled data element array.

In FIG. 10, the MUX 920 selects a single re-arranged data element array from among "25" re-arranged element arrays based on the value of the control bits, or a value of the number indicators. Accordingly, the MUX 920 corresponds to a 25×1 MUX.

Figure 11:
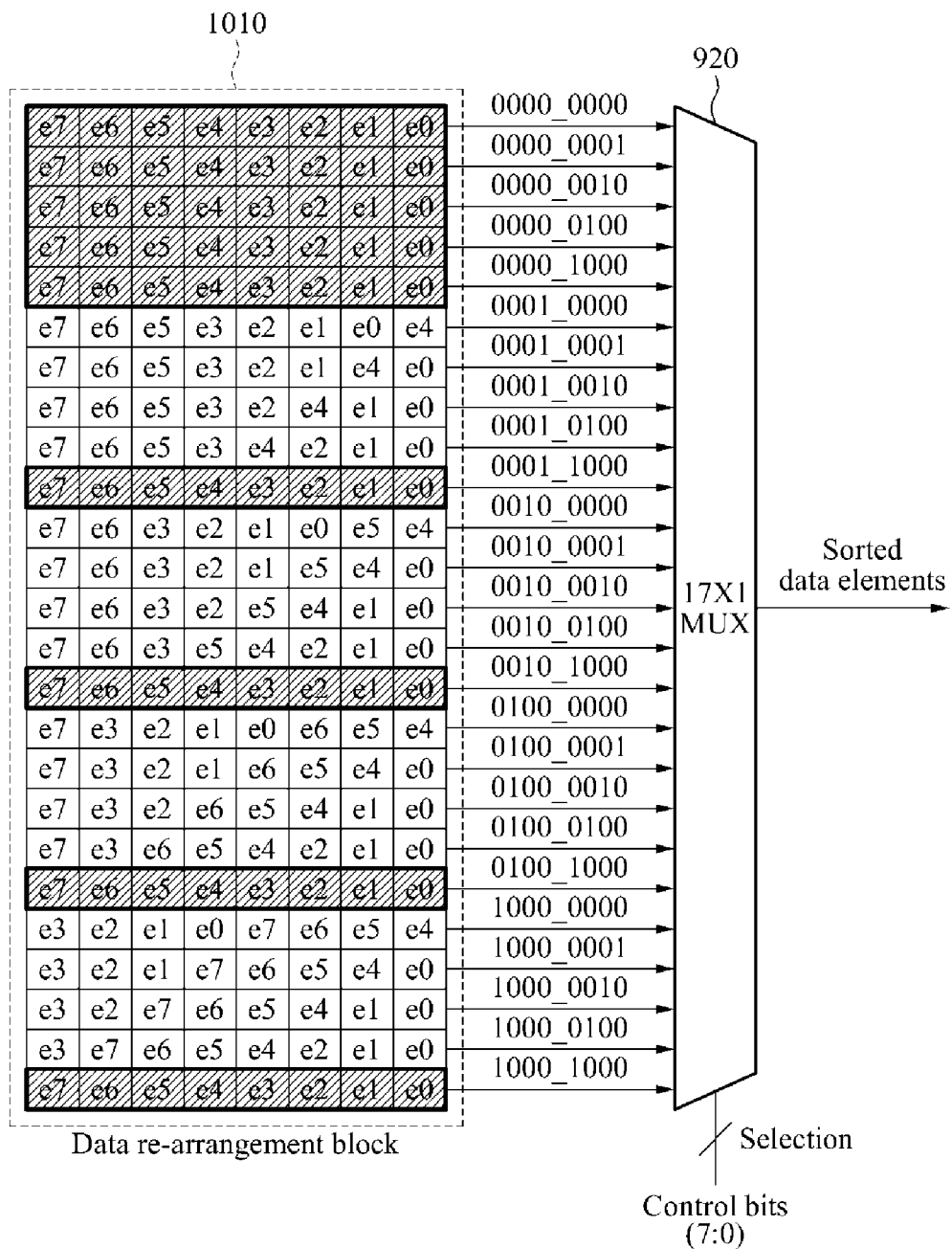
FIG. 11 is a diagram illustrating an example of a data re-arrangement block including overlapping re-arranged data element arrays and a selection by a MUX.

FIG. 11 is a diagram illustrating an example of a data re-arrangement block 1010 including overlapping re-arranged data element arrays and a selection by a MUX 920.

Referring to FIG. 11, a portion of re-arranged data element arrays of the data re-arrangement block 1010 is an overlapping portion. The overlapping portion of the re-arranged data element arrays is distinguished by hashing in FIG. 11.

The overlapping re-arranged data element arrays are assumed to be a single re-arranged data element. For example, "0000_0000", "0000_0001", "0000_0010", "0000_0100", "0000_1000", "0001_1000", "0010_1000", "0100_1000", and "1000_1000" are assumed to be identical values from among control bits input to the MUX 920. The aforementioned values "0000 0000", "0000 0001", "0000 0002", "0000 0100", "0000 1000", "0001 1000", "0010 1000", "0100 1000", and "1000 1000" indicate differing selected data elements. However, in said values, positions of data elements of an input data element array are maintained subsequent to shuffling being performed.

Accordingly, when the values of the control bits that maintain the positions of the data elements are assumed to be a single value, a number of the re-arranged data element arrays is "17" in FIG. 11. The MUX 920 selects a single re-arranged data element array from among the "17" re-arranged data element arrays based on the values of the control bits, or values of number indicators. Consequently, the MUX 920 corresponds to a 17×1 MUX, because certain values of the control bits are all considered to be a single value.

In FIG. 10, as described above, the MUX 920 is illustrated as a 25×1 MUX.

The number of the re-arranged data element arrays to be selected by the MUX 920 is defined by Equation 1.

$$P = \left(\frac{H}{2} + 1\right)^2 \qquad \text{Equation 1}$$

In Equation 1, P denotes the number of the re-arranged data element arrays to be selected by the MUX 920. H denotes a number of bits of a first number indicator and a second number indicator. For example, when the first number indicator and the second number indicator have u number of bits, respectively, a value of H is 2u.

By contrast, in FIG. 11, the MUX 920 is illustrated as a 17×1 MUX.

When the overlapping re-arranged data element arrays are treated as a single re-arranged data element, the number of the re-arranged data element arrays to be selected by the MUX 920 is represented by Equation 2.

$$P = \left(\frac{H}{2}\right)^2 + 1 \qquad \text{Equation 2}$$

In Equation 2, a value of P is explained by the following description.

N denotes a number for an SIMD shuffle instruction, and X denotes a number of stages of the SIMD shuffle instruction. In the examples of FIGS. 10-11, a value of N is assumed to be "16", and a value of X is assumed to be "3". Also, a value of H is assumed to be "8".

When the value of H is "8", a combination of "H/2*H/2" is a total of "16" combinations. For example, the "16" combinations are true combinations. The true combinations refer to combinations in which a shuffled data element array differing from an input data element array is generated. That is, the true combinations actually refer to different orderings. In other remaining combinations, the input data element array and the shuffled data element array are identical. In these remaining combinations, the control bits differ, but the result of performing shuffling is actually the same. Another true combination is a combination in which all bits have a value "0".

When results of Equation 1 and Equation 2 are compared, the value of P in Equation 1 is greater than Equation 2 by a value of "H". For example, "H+1" number of re-arranged data elements have an identical order amongst the re-arranged data elements.

The identical re-arranged data element arrays include re-arranged data element arrays described in the following three respects. First, there are re-arranged data element arrays corresponding to an instance in which both values of a first number indicator and a second number indicator are "0". Second, there are an "H/2" number of re-arranged data element arrays having a value of second number indicator differing from a value of the first number indicator when the value of first number indicator is H/2. Third, there are an "H/2" number of re-arranged data element arrays having a value of first number indicator differing from a value of the second number indicator when the value of second number indicator is "0".

In the re-arranged data element arrays, a sequential order of the data elements is maintained to be the same as a sequential order previously existing within the input data element array.

Figure 12:
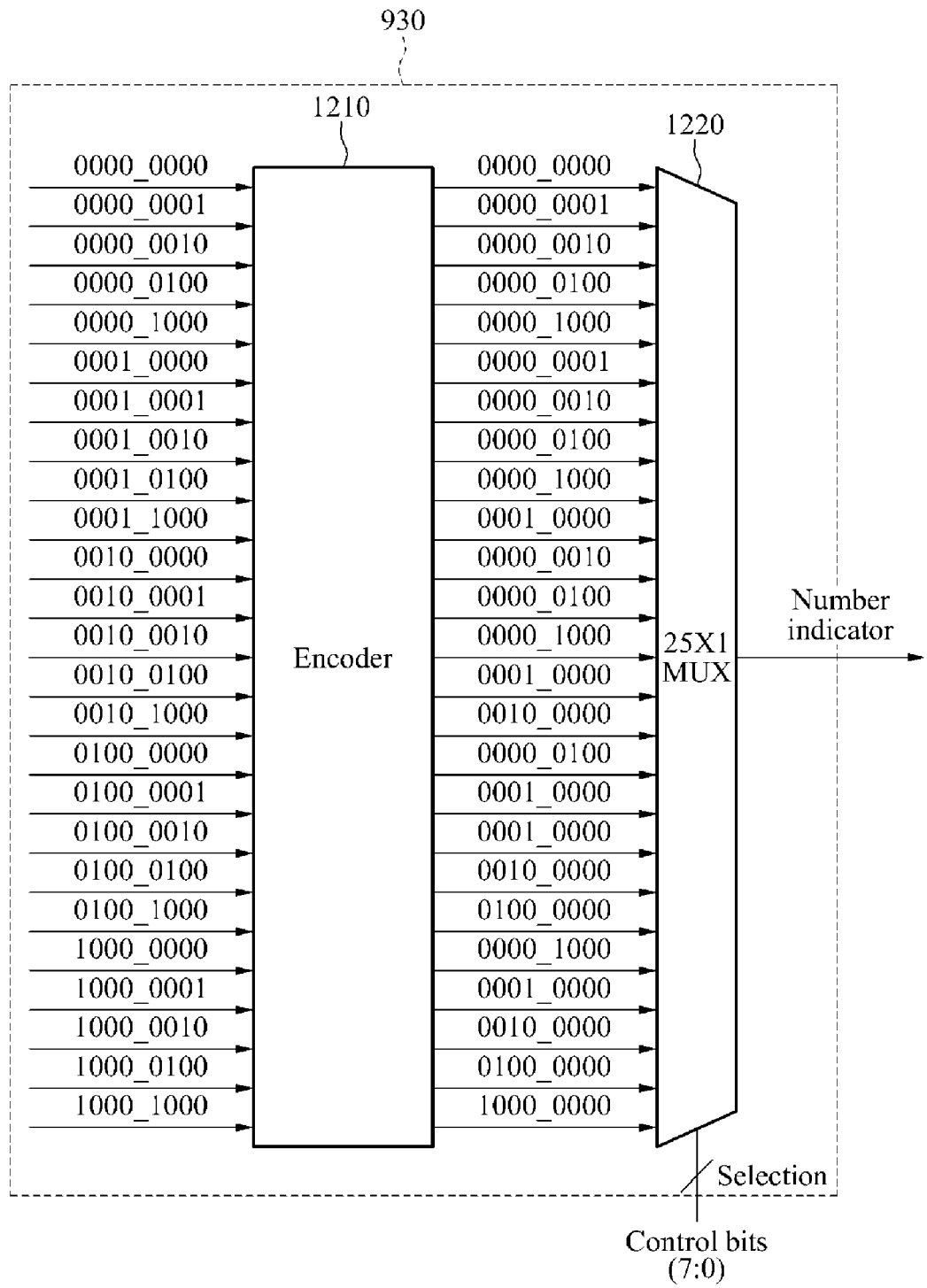
FIG. 12 is a diagram illustrating an example of a structure of a number indicator generation unit.

FIG. 12 is a diagram illustrating an example of a structure of a number indicator generation unit 930.

Referring to FIG. 12, the number indicator generation unit 930 includes an encoder 1210 and a MUX 1220.

The encoder 1210 refers to a one hot encoder or a binary encoder. These nature of these types of encoder are discussed above.

The encoder 1210 encodes input bit arrays being input to output bit arrays. The input bit arrays are concatenations of a first number indicator and a second number indicator. For example, first occurring "w/2" number of bits from among "w" number of bits of the input bit arrays indicate the first number indicator, and final occurring "w/2" number of bits indicate the second number indicator. "w" number of bits of the plurality of output bit arrays indicates a third number indicator. A value of "w" number of bits of the plurality of output bit arrays is calculated as a sum of a value of "w/2" number of bits of the first number indicator and a value of "w/2" number of bits of the second number indicator.

As described above, a value of a number indicator is determined to be a bit that indicates a selected value from among bits of the number indicator.

For example, in FIG. 12, in a ninth input bit array "0001_0010", first occurring bits "0010" correspond to the first number indicator, and subsequent occurring bits "0001" correspond to the second number indicator. A bit having a selection value "1" in the first occurring bits "0010" is a second bit from a front. Accordingly, a value of the first number indicator is "2". For example, the first number indicator indicates that the first two data elements are selected data elements in the input data element array corresponding to the first number indicator. Also, a bit having the selection value "1" in the subsequent occurring bits "0001" is a very first bit. Correspondingly, a value of the second number indicator is "1".

A value of the third number indicator output from the intermediate shuffle unit 900 is calculated as a sum of the value of the first number indicator and the value of the second number indicator input to the intermediate shuffle unit 900. Accordingly, when a value of the input bit arrays is "0001 0010", the value of the third number indicator is "3", since it is the sum of "2" and "1", and a third bit from among bits of the third number indicator has the selection value "1".

The encoder 1210 generates output bit arrays with respect to all possible input bit arrays.

The MUX 1220 selects a single output bit array from among output bit arrays input to the MUX 1220 based on values of control bits. For example, when a value of the control bits is "0000 0000", the MUX 1220 selects a first output bit array corresponding to an input bit array "0000 0000" from among the output bit arrays. The MUX 1220 outputs the selected output bit array as a number indicator.

Figure 13:
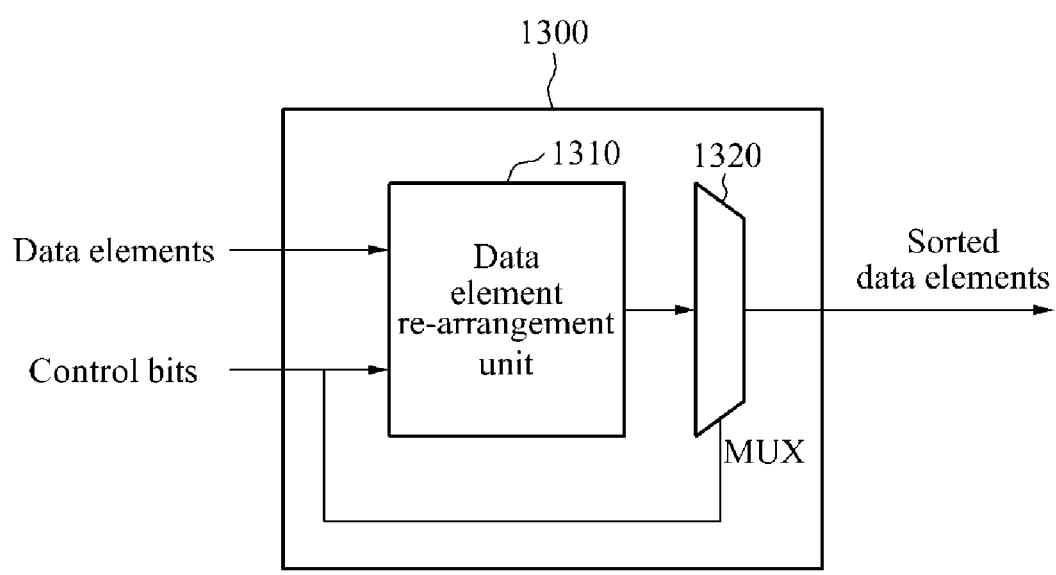
FIG. 13 is a diagram illustrating an example of a structure of a final shuffle unit.

FIG. 13 is a diagram illustrating an example of a structure of a final shuffle unit 1300.

The final shuffle unit 1300 includes a data element re-arrangement unit 1310 and a MUX 1320.

Functions of the data element re-arrangement unit 1310 correspond to the data element re-arrangement unit 910 described with reference to FIG. 9 in the foregoing. Thus, repeated descriptions are omitted for conciseness and increased clarity.

Functions of the MUX 1320 correspond to the MUX 920 described with reference to FIG. 9 in the foregoing. Thus, repeated descriptions are also omitted for conciseness and increased clarity.

Sorted data elements output from the MUX 1320 include data elements of a final shuffled data element array.

Figure 14:
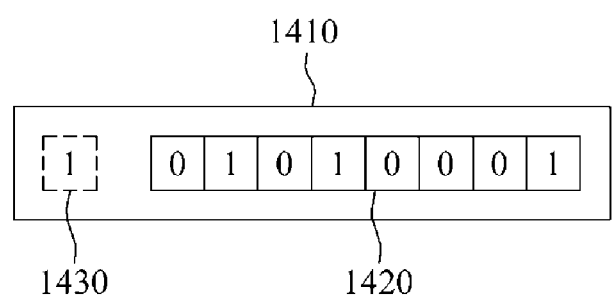
FIG. 14 is a diagram illustrating an example of a flag designating a value indicating a selection.

FIG. 14 is a diagram illustrating an example of a flag 1430 designating a value indicating a selection.

In the examples described above, the selection value is indicated as "1", and the un-selection value is indicated as "0". However, those examples are only possible examples, and the scope of the provided description herein is not to be construed as being limited to such example. Thus, examples also include appropriate variations of such implementations. Thus, predetermined values to be supported by an apparatus for processing a shuffle instruction are used as alternative examples of the selection value and the un-selection value.

As illustrated in FIG. 14, a second operand 1410 includes control bits 1420 and the flag 1430.

The flag 1430 sets a selection value from among values of the control bits 1420. Values remaining subsequent to excluding the selection value from among the values of the control bits 1420 are un-selection values. Thus, the flag 1430 acts as an indicator that provides which value of a control bit, from among the control bits 1420, should be interpreted to indicate a selection value as opposed to an un-selection value.

For example, in FIG. 14, a value of the flag 1430 is "1". Accordingly, "1" is set to be the selection value, and "0" is set to be the un-selection value.

By contrast to the example illustrated in FIG. 14, the flag 1430 is a third operand of an SIMD shuffle instruction, rather than a portion of the second operand 1410.

Figure 15:
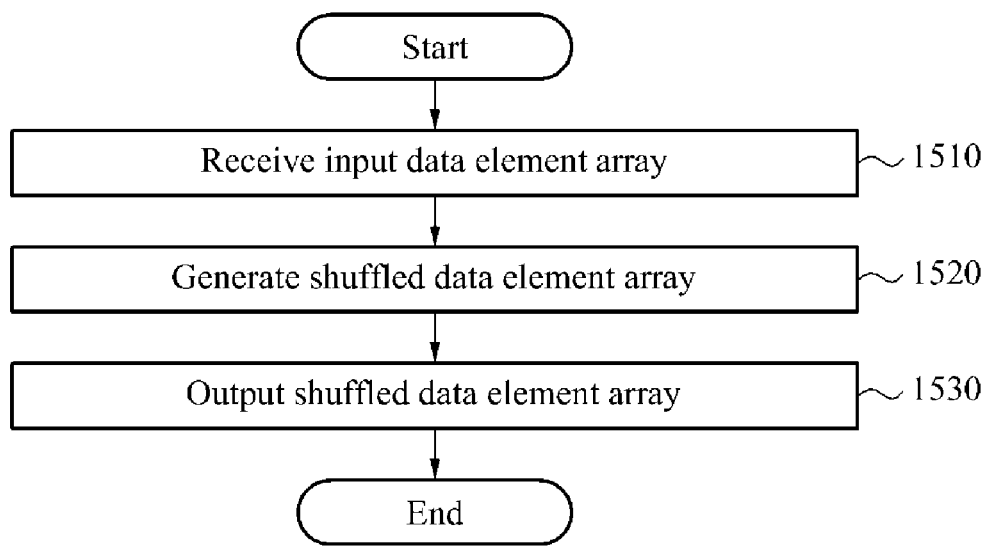
FIG. 15 is a flowchart illustrating an example of a method of processing a shuffle instruction.

FIG. 15 is a flowchart illustrating an example of a method of processing a shuffle instruction.

Operations 1510 through 1530 to be described hereinafter are performed by a portion of shuffle units configured in a hierarchical structure.

In operation 1510, the method receives an input data element array. For example, at least one from among the shuffle units receives an input data element array.

In operation 1520, the method generates a shuffled data element array by performing shuffling on the input data element array. For example, the at least one of the shuffle units generates a shuffled data element array by performing shuffling on the input data element array.

In operation 1530, the method outputs the generated shuffled data element array. For example, the at least one of the shuffle units outputs the generated shuffled data element array.

In an upper shuffle unit and at least one lower shuffle unit connected in the hierarchical structure, the shuffled data element array output from each of the at least one lower shuffle unit is input to the upper shuffle unit as a portion of the input data element array to be shuffled.

Descriptions provided with reference to FIGS. 1 through 14 in the foregoing apply to an example method of FIG. 15, and thus repeated descriptions are omitted for conciseness.

The aforementioned examples are potentially used for a cellular modem, a wireless fidelity (Wi-Fi) modem, and a digital television (DTV) receiver based on an SIMD-based processor to facilitate shuffle operations in these devices. However, these are merely examples and other applied examples use the approaches discussed above to improve the efficiency of shuffle operations.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

A terminal, which may be referred to as a computer terminal, may be an electronic or electromechanical hardware device that is used for entering data into and displaying data received from a host computer or a host computing system. A terminal may be limited to inputting and displaying data, or may also have the capability of processing data as well. A terminal with a significant local programmable data processing capability may be referred to as a smart terminal or fat client. A terminal that depends on the host computer or host computing system for its processing power may be referred to as a thin client. A personal computer can run software that emulates the function of a terminal, sometimes allowing concurrent use of local programs and access to a distant terminal host system.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to process a shuffle instruction, the apparatus comprising:
    shuffle units comprising an upper shuffle unit and a lower shuffle unit configured in a hierarchical structure, each of the shuffle units being configured to output a shuffled data element array by performing shuffling with respect to an input data element array,
    wherein the shuffled data element array output from the lower shuffle unit is configured to be input to the upper shuffle unit as a portion of the input data element array of the upper shuffle unit, and
    wherein the lower shuffle unit is configured to output a number indicator indicating a number of data elements selected in the shuffling by the lower shuffle unit with the shuffled data element array output from the lower shuffle unit.

2. The apparatus of claim 1, wherein the hierarchical structure is provided as a binary tree.

3. The apparatus of claim 1, wherein the input data element array of the upper shuffle unit is formed by concatenating, based on a sequential order of the lower shuffle unit, the shuffled data element array output from the lower shuffle unit.

4. The apparatus of claim 1, wherein the shuffling outputs data elements indicated by data selected from the input data element array preceding unselected data elements in the shuffled data element array.

5. The apparatus of claim 4, wherein the data elements selected in the shuffling by the lower shuffle unit are also selected in the upper shuffle unit.

6. The apparatus of claim 1, wherein the upper shuffle unit is further configured to process, as the selected data elements, data elements corresponding to the number indicator from earliest occurring data elements in the shuffled data element array output from the lower shuffle unit.

7. The apparatus of claim 1, wherein each of the shuffle units comprises:
    a basic shuffle unit corresponding to a leaf node of the hierarchical structure; and
    a final shuffle unit corresponding to a root node of the hierarchical structure.

8. The apparatus of claim 7, wherein
    divided control bits are input into the basic shuffle unit,
    the divided control bits comprise portions of control bits of a single instruction multiple data (SIMD) instruction that is divided into n numbers, and
    n is a number of the basic shuffle units among the shuffle units.

9. The apparatus of claim 8, wherein the basic shuffle unit is configured to generate the shuffled data element array using the input data element array and the divided control bits, and to dispose data elements of the input data element array corresponding to a control bit having the selection value preceding data elements corresponding to a control bit having the un-selection value to generate the shuffled data element array, and wherein the divided control bits each have a selection value or an un-selection value.

10. The apparatus of claim 9, wherein the basic shuffle unit is further configured to output a number indicator indicating a number of control bits having the selection value from among the input control bits.

11. The apparatus of claim 7, wherein an input data element array of the final shuffle unit is formed by concatenating a first shuffled data element array output from a first lower shuffle unit, and a second shuffled data element array output from a second lower shuffle unit.

12. The apparatus of claim 11, wherein the final shuffle unit is configured to determine first selected data elements and first unselected data elements from the first shuffled data element array based on a first number indicator output from the first lower shuffle unit, to determine second selected data elements and second unselected data elements from the second shuffled data element array based on a second number indicator output from the second shuffle unit, and to output a final shuffled data element array, and
    the final shuffled data elements array comprises the first selected data elements, the second selected data elements, the first unselected data elements, and the second unselected data elements in sequential order.

13. The apparatus of claim 12, wherein the final shuffle unit is further configured to determine a number of data elements corresponding to the first number indicator, from an earliest occurring element from the first shuffled data element array, to be the first selected data elements, and to determine a number of data elements corresponding to the second number indicator from an earliest occurring data element, from the second shuffled data element array, to be the second selected data elements.

14. The apparatus of claim 7, wherein the shuffle units further comprise an intermediate shuffle unit corresponding to an intermediate node of the hierarchical structure.

15. The apparatus of claim 14, wherein the input data element array of the intermediate shuffle unit is formed by concatenating a first shuffled data element array output from a first lower shuffle unit and a second shuffled data element array output from a second lower shuffle unit.

16. The apparatus of claim 15, wherein the intermediate shuffle unit is configured to determine first selected data elements and first unselected data elements from the first shuffled data element array using a first number indicator output from the first lower shuffle unit, and to determine second selected data elements and second unselected data elements from the second shuffled data element array using a second number indicator output from the second lower shuffle unit, and
    a shuffled data element array of the intermediate shuffle unit comprises the first selected data elements, the second selected data elements, the first unselected data elements, and the second unselected data elements.

17. The apparatus of claim 16, wherein the intermediate shuffle unit is further configured to determine a number of data elements corresponding to the first number indicator, from an earliest occurring data element from the first shuffled data element array, to be the first selected data elements, and to determine a number of data elements corresponding to the second number indicator, from an earliest occurring data element from the second shuffled data array, to be the second selected data elements.

18. The apparatus of claim 15, wherein the intermediate shuffle unit is configured to output a third number indicator, and a value of the third number indicator is calculated as a sum of the first number indicator and the second number indicator.

19. A method of processing a shuffle instruction by shuffle units comprising an upper shuffle unit and a lower shuffle unit configured in a hierarchical structure, the method comprising:

receiving, by each of the shuffle units, an input data element array;

generating, by each of the shuffle units, a shuffled data element array by performing shuffling with respect to the input data element array; and outputting, by the each of the shuffle units, the generated shuffled data element array, wherein the shuffled data element array output from the lower shuffle unit is configured to be input to the upper shuffle unit as a portion of the input data element array of the upper shuffle unit.

* * * * *